US012122162B2

(12) United States Patent
Shimoda et al.

(10) Patent No.: US 12,122,162 B2
(45) Date of Patent: Oct. 22, 2024

(54) METHOD FOR MANUFACTURING LIQUID DISCHARGE HEAD AND LIQUID DISCHARGE HEAD

(71) Applicant: CANON KABUSHIKI KAISHA, Tokyo (JP)

(72) Inventors: Takumi Shimoda, Kanagawa (JP); Kazuaki Shibata, Kanagawa (JP); Atsunori Terasaki, Kanagawa (JP); Toshiyasu Sakai, Kanagawa (JP); Ryoji Kanri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 17/751,916

(22) Filed: May 24, 2022

(65) Prior Publication Data

US 2022/0388309 A1 Dec. 8, 2022

(30) Foreign Application Priority Data

May 31, 2021 (JP) ................................ 2021-091675
Mar. 22, 2022 (JP) ................................ 2022-045262

(51) Int. Cl.
*B41J 2/16* (2006.01)
*B41J 2/14* (2006.01)

(52) U.S. Cl.
CPC ......... *B41J 2/1646* (2013.01); *B41J 2/14129* (2013.01); *B41J 2/1603* (2013.01)

(58) Field of Classification Search
CPC .... B41J 2/1646; B41J 2/14129; B41J 2/1603; B41J 2/1606; B41J 2/1623; B41J 2/1628; B41J 2/1629; B41J 2/1635; B41J 2/1642
See application file for complete search history.

(56) References Cited

U.S. PATENT DOCUMENTS 6,331,259 B1 * 12/2001 Ozaki .................... B41J 2/1646 216/27
8,721,048 B2 5/2014 Yasuda et al.

FOREIGN PATENT DOCUMENTS

JP 2000-225708 A 8/2000
JP 2017-121813 A 7/2017

OTHER PUBLICATIONS

Yonemoto et al., U.S. Appl. No. 17/751,925, filed May 24, 2022.

* cited by examiner

*Primary Examiner* — Bradley W Thies
(74) *Attorney, Agent, or Firm* — Venable LLP

(57) ABSTRACT

A method for manufacturing a liquid discharge head comprising: a substrate, a protective layer covering at least a part of the substrate, and a laminate member formed on the protective layer, wherein the method comprises steps of: forming the protective layer on at least a part of the substrate; forming the laminate member on the protective layer with a part of the protective layer exposed, the protective layer comprises at least Si and C, a content of oxygen in a bulk of the protective layer is less than 20 atomic % in terms of an element composition ratio, a modified layer with a content of oxygen of 20 atomic % or more in terms of an element composition ratio is present on a surface of the protective layer, and a thickness of the modified layer between the protective layer and the laminate member is 3.40 nm or less.

11 Claims, 6 Drawing Sheets

METHOD FOR MANUFACTURING LIQUID DISCHARGE HEAD AND LIQUID DISCHARGE HEAD

BACKGROUND OF THE INVENTION

Field of the Invention

The present disclosure relates to a method for manufacturing a liquid discharge head, and a liquid discharge head.

Description of the Related Art

In a liquid discharge head such as an inkjet head, a liquid feeding port or a liquid passage for feeding a discharge liquid to a substrate of silicon or the like is formed. The systems for discharging a liquid include a system of a type in which a liquid is heated by a heat generating element to be foamed, and the liquid is discharged using the growth of the bubbles. In this type of liquid discharge head, a heat generating element and a circuit for driving the heat generating element are formed on a substrate.

Conventionally, it is known that as an insulation protective layer for protecting the substrate, the heat generating element, and the circuit, of the liquid discharge head from a discharge liquid, a SiN film deposited by a CVD method, or the like is used (Japanese Patent Application Publication No. 2000-225708).

However, with recent diversification of the kind of the discharge liquid, there appears also a discharge liquid which dissolves the material to be used for a conventional liquid discharging head such as SiN. As a protective layer for protecting the substrate, the heat generating element, and the circuit also from such a discharge liquid, a SiCN film deposited by a CVD method may be used (Japanese Patent Application Publication No. 2017-121813).

SUMMARY OF THE INVENTION

In a liquid discharge head of the type in which a liquid is discharged with a heat generating element, a nozzle member having a liquid discharge port, and the like are stacked on a substrate. At this step, when a contaminant is present on the substrate, the adhesion between the substrate and the laminate is inhibited. For this reason, in order to enhance the adhesiveness, the contaminant on the substrate may be removed by some method before stacking. As one of the methods for removing the organic contamination of the contaminant, ashing by an oxygen plasma is known. Ashing is the method for generating an oxygen plasma, allowing an oxygen radical to react with an organic matter, causing decomposition into $CO_2$ and $H_2O$ for vaporization, and thereby removing the organic matter. Alternatively, in order to increase the removal rate, there is a method for applying an RF bias, and colliding oxygen ions linearly to the object, and promoting the reaction.

When ashing is carried out on the liquid discharge head to which a SiCN film is applied as a protective layer as disclosed in Japanese Patent Application Publication No. 2017-121813, the surface layer of the SiCN film reacts with oxygen radicals and/or oxygen ions. As a result of this, the content of oxygen increases as compared with bulk SiCN, so that a layer having an oxygen content of more than 20 atomic % in terms of element composition ratio is formed. Hereinbelow, this layer is referred to as a modified layer. Conventionally, a SiCN film has a sufficiently high dissolution resistance to various discharge liquids. However, it has been ascertained that the modified layer is reduced in dissolution resistance as compared with bulk SiCN. Qualitatively, also for other Si type films, when a modified layer is formed on the surface by oxygen ashing, presumably, the films become more likely to be dissolved in a discharge liquid as with the foregoing description.

When the modified layer of the SiCN surface layer subjected to ashing is dissolved, floating may occur at the end of the laminate (see FIGS. 2A to 2C). This is presumed as follows: the dissolution of the modified layer 3*a* proceeds, and erosion occurs to the modified layer under the laminate, resulting in the formation of a floating part 8.

The present disclosure provides a method for manufacturing a liquid discharge head and a liquid discharge head. The liquid discharge head is high in adhesiveness between a protective layer and a laminate member on the protective layer even when a modified layer is formed on the protective layer for a heat generating element and a circuit on a substrate, and the like by carrying out oxygen ashing, or by other procedures.

The present disclosure relates to a method for manufacturing a liquid discharge head comprising:

- a substrate,
- a protective layer covering at least a part of the substrate, and
- a laminate member formed on the protective layer, wherein
- the method comprises
  - a step of forming the protective layer on at least a part of the substrate, and
  - a step of forming the laminate member on the protective layer with a part of the protective layer exposed,
- the protective layer comprises at least Si and C,
- a content of oxygen in a bulk of the protective layer is less than 20 atomic % in terms of an element composition ratio,
- a modified layer with a content of oxygen of 20 atomic % or more in terms of an element composition ratio is present on a surface of the protective layer, and
- a thickness of the modified layer between the protective layer and the laminate member is 3.40 nm or less.

Another aspect of the present disclosure relates to a liquid discharge head, comprising:

- a substrate;
- a protective layer covering at least a part of the substrate; and
- a laminate member formed on the protective layer, wherein
- the laminate member is provided so as to form an exposed part at which a part of the protective layer is exposed,
- the protective layer comprises at least Si and C,
- a content of oxygen in a bulk of the protective layer is less than 20 atomic % in terms of an element composition ratio,
- a modified layer with a content of oxygen of 20 atomic % or more in terms of an element composition ratio is present on a surface of the protective layer, and
- a thickness of the modified layer between the protective layer and the laminate member is 3.40 nm or less.

The present disclosure can provide a method for manufacturing a liquid discharge head which is high in adhesiveness between a protective layer and a laminate member on the protective layer even when a modified layer is formed on the protective layer for a substrate, a heat generating element, a circuit, and the like by carrying out oxygen ashing, or other procedures. Further features of the present invention will become apparent from the following description of exemplary embodiments with reference to the attached drawings.

DESCRIPTION OF THE EMBODIMENTS

Hereinafter, embodiments of the present disclosure will be specifically illustrated with reference to the drawings. However, the dimensions, materials, shapes of components described in this form, the relative arrangement thereof, and the like should be changed, as appropriate, depending on the configuration of the members and various conditions to which the disclosure is applied. That is, the scope of the present disclosure is not intended to be limited to the following embodiments.

In the present disclosure, the expression of "from XX to YY" or "XX to YY" indicating a numerical range means a numerical range including a lower limit and an upper limit which are end points, unless otherwise specified. When a numerical range is described in a stepwise manner, the upper and lower limits of each numerical range can be arbitrarily combined.

Figure 1:
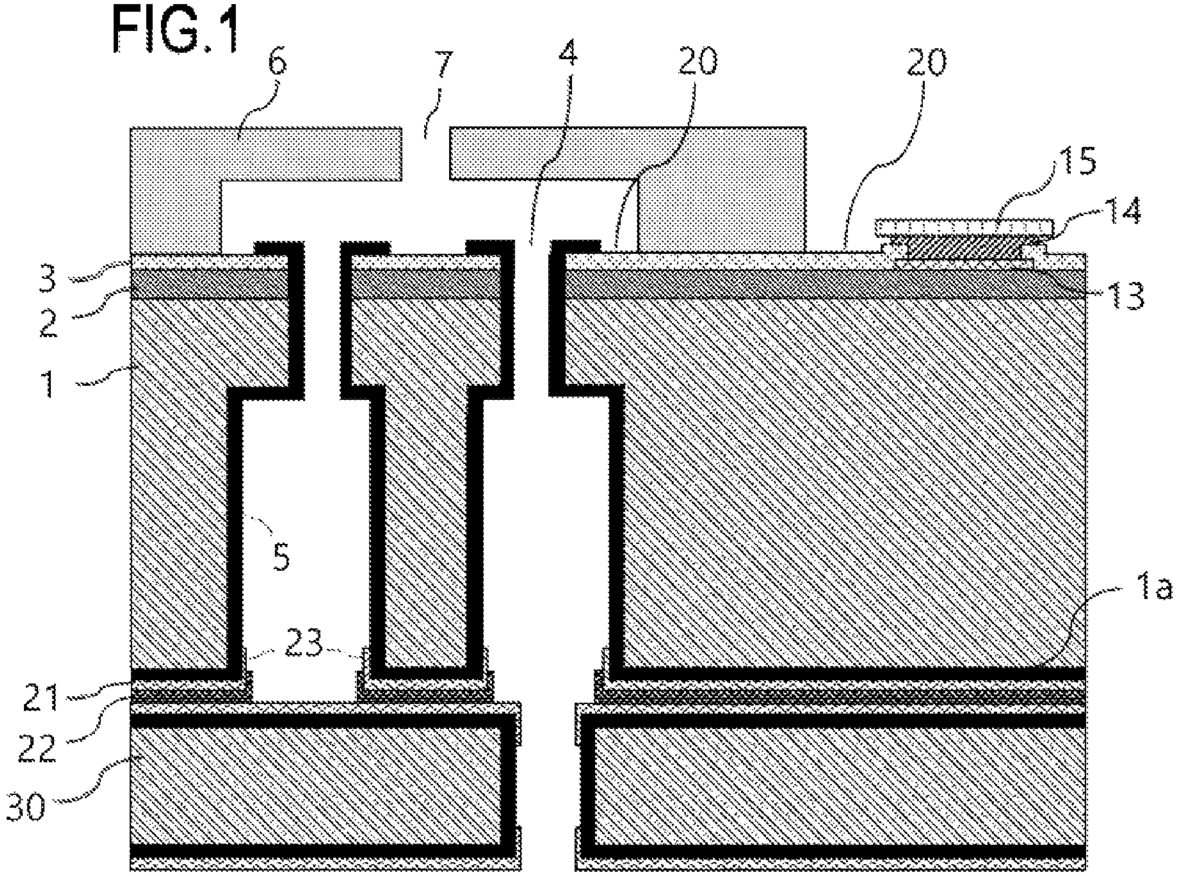
FIG. 1 is a cross sectional view showing an embodiment of a liquid discharge head.

As an application example to a liquid discharge head, a description will be given by taking an inkjet head as an example. However, the application range of the liquid discharge head is not limited thereto. FIG. 1 is a cross sectional view showing a configuration example of a liquid discharge head. A substrate 1 has an element surface 2 including a heat generating element, a circuit, and the like. Further, a protective layer 3 for protecting the element surface 2 is formed thereon. On a surface 1*a* opposite to the element surface 2 of the substrate 1, a back surface protective layer 21 for protecting the substrate is formed. In the substrate 1, a liquid feeding port 4 for feeding a discharge liquid (e.g., an ink) is formed, and a sidewall protective layer 5 is formed as a laminate member at the sidewall. A part of the protective layer 3 is opened, so that an electrode pad 13 to be electrically connected with a heat generating element is exposed. A laminate member as a bump including an electrode layer 15 and an adhesion layer 14 is formed on a part of the protective layer 3 and the electrode pad 13.

The sidewall protective layer 5 is formed in such a manner as to cover a part of the top of the protective layer 3, and protects the erosion of a discharge liquid to the element surface 2. A discharge port forming member 6 is stacked as a laminate member on the protective layer 3. The discharge port forming member 6 forms some mechanical structure such as a liquid passage, and has a discharge port 7 for discharging a liquid. On the back surface protective layer 21, an adhesion material 22 is stacked as a laminate member, to which a junction substrate 30 is joined. In this manner, as the laminate members, mention may be made of the sidewall protective layer 5, the discharge port forming member 6, the adhesion layer 14, the electrode layer 15, the adhesion material 22, and the like. The laminate members are formed in such a manner as to form a protective layer exposure part 20 at which a part of the protective layer 3 is exposed on the protective layer 3, a back surface protective layer exposure part 23 at which a part of the back surface protective layer 21 is exposed on the back surface protective layer 21, and the bump including a diffusion preventive layer 14 and the electrode layer 15. Further, the laminate member can also be formed as a passage member for forming the passage for a liquid.

The material for the substrate 1 has no particular restriction, and known ones as the substrate of a liquid discharge head may be used. Examples of the substrate 1 may include a silicon substrate. The protective layer 3 and the back surface protective layer 21 protect the element surface 2 and the surface 1*a* from being exposed to a discharge liquid, respectively. The material is required not to be dissolved in a discharge liquid, and to be high in adhesiveness with the discharge port forming member 6 and the material (e.g., an organic resin) included in the adhesion material 22 as the condition. As such materials, the protective layer 3 and the back surface protective layer 21 include at least Si and C. Examples thereof may include silicon carbide type compounds.

The protective layer 3 and the back surface protective layer 21 include preferably at least one selected from the group consisting of a SiC film, a SiCN film, a SiOC film, and a SiOCN film. When a SiOC film and a SiOCN film are selected, the content of oxygen in the bulk is required to be set at less than 20 atomic % in terms of element composition ratio. More preferably, the back surface protective layer 21 is a SiC film, and the protective layer 3 is a SiCN film. The SiCN film is preferably expressed as $Si_xC_yN_z$ (where $x+y+z=100$, $30\leq x\leq 60$, $y\geq 5$, and $z\geq 15$ (more preferably $40\leq x\leq 55$, $5\leq y\leq 15$, and $30\leq z\leq 50$)). The protective layer 3 and the back surface protective layer 21 can be formed by a known method such as a CVD method.

The content of oxygen in the bulk of the protective layer is less than 20 atomic % in terms of element composition ratio. The term "the bulk of the protective layer" means the portion of the homogeneous composition of the inside of the protective layer except for the surface vicinity of the protective layer.

The sidewall protective layer 5 as the laminate member has a function of preventing the substrate 1 and the element surface 2 from being exposed to a discharge liquid, and being eroded. The sidewall protective layer 5 as the laminate member preferably includes an oxide of at least one metal selected from the group consisting of, for example, Ti, Zr, Hf, V, Nb, and Ta. Namely, the laminate member preferably includes a metal oxide. TiO is preferable. Alternatively, the same silicon carbide type compounds including Si and C as those of the protective layer 3 are also acceptable. The sidewall protective layer 5 can be formed by a known method such as an atomic layer deposition method. The thickness of the sidewall protective layer 5 has no particular restriction, and is preferably 10 to 200 nm, and more preferably 50 to 150 nm.

The discharge port forming member 6 as the laminate member preferably includes an organic resin. As the organic resins, known ones for use in the discharge port forming member of the liquid discharge head can be adopted.

Examples thereof may include an epoxy resin, and a photosensitive resin such as a photosensitive epoxy resin is preferable. Specifically, mention may be made of bisphenol A type and F type epoxy resins; phenol novolak type epoxy resins; cresol novolak type epoxy resins; multifunctional epoxy resins having a norbornene skeleton, a terpene skeleton, a dicyclopentadiene skeleton, an oxycyclohexane skeleton, or the like; and the like.

The adhesion layer 14 as the laminate member preferably includes at least one selected from the group consisting of a Ti film, a TiW film, a TiN film, a Ta film, a TaN film, and a Cr film, and more preferably includes a TiW film.

The inclusion of the foregoing films in the adhesion layer can improve the adhesiveness between the electrode layer 15 and the protective layer 13.

The adhesion material 22 as the laminate member preferably includes an organic resin. As the organic resins, known ones for use in the adhesion material of a Si substrate can be adopted. Examples thereof may include a benzocyclobutene resin.

The electrode pad 13 preferably includes a noble metal. Examples of the noble metal may include gold, silver, platinum, palladium, rhodium, iridium, ruthenium, osmium, and rhenium. Iridium is in particular preferable.

The electrode layer 15 as the laminate member is preferably a film including a noble metal. Examples of the film including a noble metal may include an Au film, an Ag film, a Pt film, a Pd film, a Rh film, an Ir film, a Ru film, an Os film, and a Re film. An Au film is in particular preferable.

The materials for the members mentioned as the laminate members can be used in given combinations. The laminate members preferably include an Au film and a TiW film.

When contamination occurs on the protective layer 3, or on the back surface protective layer 21, at the interface between the protective layer 3 and the sidewall protective layer 5, the discharge port forming member 6, or the adhesion layer 14, the interface between the back surface protective layer 21 and the adhesion material 22, and the interface between the protective layer 3 and the adhesion layer 14, the adhesiveness is reduced, resulting in occurrence of interface peeling. In order to suppress this, the contamination is required to be removed by some method. Contamination includes organic contamination. Examples thereof may include peeling residue caused in such a step as to remove the mask resist during silicon processing. As one of the methods for removing the organic contamination, for example ashing by an oxygen plasma is used. Oxygen ashing is carried out on the top of the protective layer 3 and the top of the back surface protective layer 21, thereby removing organic contamination. As a result, the interface peeling can be suppressed.

Figure 2A:
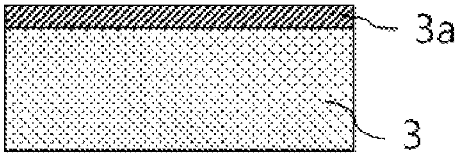
FIGS. 2A to 2C and FIGS. 2A' to 2C' are each a cross sectional view for illustrating the formation of a floating part.
Figure 2A:
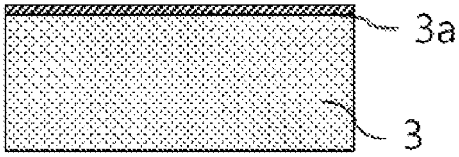
Figure 2B:
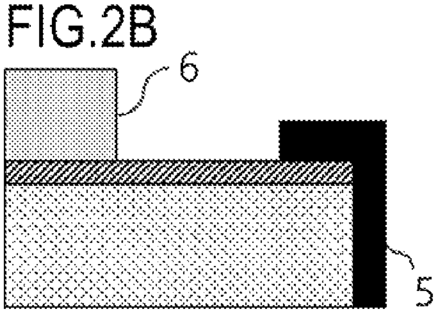
Figure 2B:
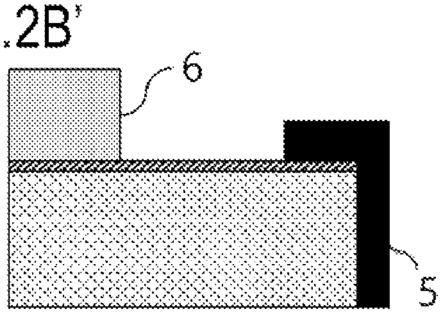
Figure 2C:
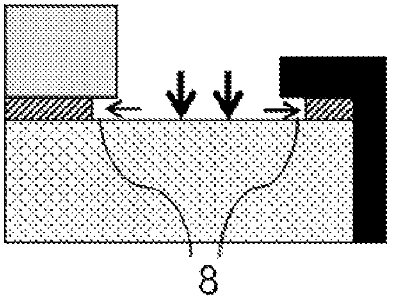
Figure 2C:
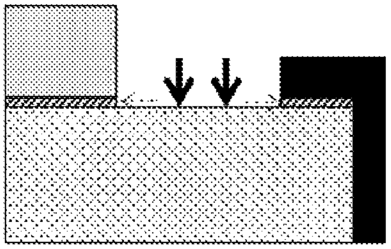
Figure 5A:
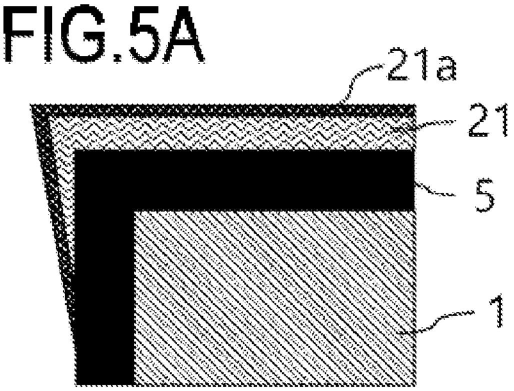
FIGS. 5A to 5C and FIGS. 5A' to 5C' are each a cross sectional view for illustrating the formation of a floating part.
Figure 5A:
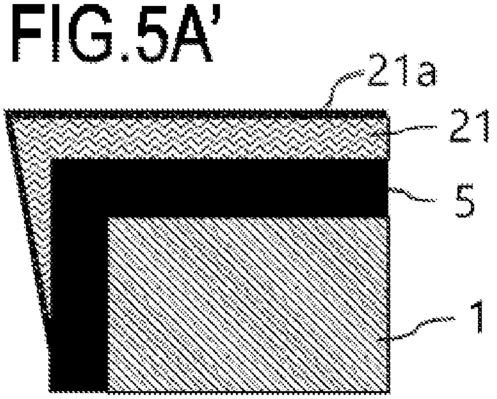
Figure 5B:
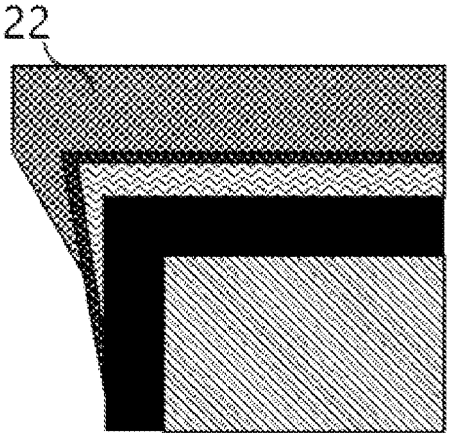
Figure 5B:
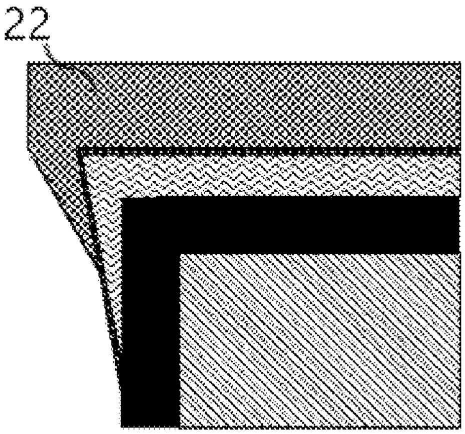
Figure 5C:
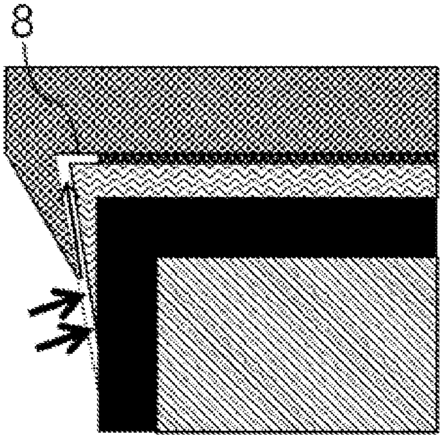
Figure 5C:
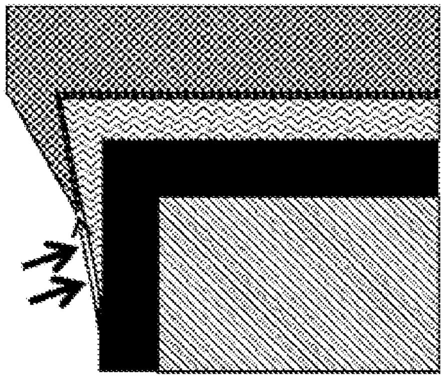

However, when ashing is carried out on the top of the protective layer 3, oxygen radicals and/or oxygen ions react with not only organic contamination but also the surface of the protective layer 3. As a result of this, a modified layer 3*a* is formed on the surface layer of the protective layer 3 (FIG. 2A). A silicon type compound increased in oxygen content is reduced in dissolution resistance to a discharge liquid than usual, so that a floating part 8 may be formed at the ends of the sidewall protective layer 5, the discharge port forming member 6, and the adhesion layer 14 as with the estimation mechanism (FIGS. 2B and 2C). Also for the back surface protective layer 21, a floating part 8 may be formed at the end of the adhesion material 22 with the same mechanism (FIGS. 5A to 5C).

The thickness of the modified layer 3*a* is measured by the ellipsometry method. It is understood that construction of an optical model including one SiO layer at the outermost layer results in good fitting when the thicknesses of the protective layer 3 and the back surface protective layer 21 subjected to ashing are measured with this method. This SiO layer is referred to as a modified layer 3*a*, and the thickness thereof is referred to as the thickness of the modified layer 3*a*. For the thickness of the modified layer 3*a*, the thicknesses at 9 points in plane are measured, and the average value thereof is calculated.

Specifically, the thickness of the modified layer 3*a* is determined in the following manner. The film thickness of the protective layer such as a SiCN film is measured with a film thickness measuring device by a spectroscopic ellipsometer. At this step, analysis by a Tauc-Lorentz model generally used for a spectroscopic ellipsometer is performed. Even deposition of a film on the substrate does not always result in a simple monolayer film. The surface of the deposited film may be nonuniform or discontinuous, or may include an oxide layer thereon. Such a surface is analyzed assuming an optical model including one SiO layer at the outermost layer, and the film thickness of the resulting SiO layer is regarded as the film thickness of the modified layer 3*a*.

Incidentally, in the bulk of the protective layer, or the modified layer 3*a*, the content of oxygen in terms of element composition ratio is confirmed in the following manner. Using X-ray photoelectron spectroscopy (XPS), the composition analysis of the protective layer surface is performed. The photoelectron spectrum obtained by irradiation with an X ray is analyzed, and the element composition ratios forming the protective layer are measured. When the measurement of the bulk is performed, appropriately, sputtering using Ar is performed. Thus, measurement may be performed with the bulk exposed.

Herein, an experiment for examining the relationship between the thickness of the modified layer 3*a* and the occurrence of floating of the laminate end was performed. First, a SiCN film assumed to be the protective layer 3 was deposited with a thickness of 150 nm on a silicon substrate with a CVD method. Then, the thickness of the modified layer 3*a* which had gone through the steps of ashing, and the like was measured. Thereon, with an atomic layer deposition method (ALD method: Atomic Layer Deposition method), a TiO film assumed to be the sidewall protective layer 5 was deposited with a thickness of 80 nm.

Subsequently, the photoresist applied on the TiO film was patterned, and the TiO film was etched by a buffered hydrofluoric acid. As a result, a square TiO pattern with 40 μm per side was formed. The substrate was cleaved so as to include the TiO pattern, resulting in singulation. The floating of the TiO pattern end when the resulting individual pieces were immersed in an ink heated to 121° C. for three weeks was observed by a microscope. The results are shown in Table 1. From the results, it has been presumed that the thickness of the modified layer 3*a* has a threshold value of floating of the TiO film, and that TiO is less likely to float with a decrease in thickness of the modified layer 3*a*.

Incidentally, in Table 1, for samples A, B, D, and M, after deposition of a SiCN film, and before ashing, the modified layer is removed by reverse sputtering. For samples G and H, after deposition of a SiCN film, and before ashing, the modified layer is removed by etching using a buffered hydrofluoric acid. Whereas, for samples C, E, and F, after deposition of a SiCN film, and before ashing, the modified layer is removed by reverse sputtering. After ashing, a part of the modified layer is removed by etching using a buffered hydrofluoric acid.

TABLE 1

| Sample Name | TiO deposition pretreatment | | | | | Modified | |
|---|---|---|---|---|---|---|---|
| | | Ashing | | | | | |
| | Reverse sputtering | Stage temperature/° C. | Treatment time/s | RF bias/W | Buffered hydrofluoric acid | layer thickness/nm | TiO floating |
| A | Observed | — | — | — | — | 1.21 | None |
| B | Observed | 60 | 60 | — | — | 1.36 | None |
| C | Observed | 250 | 60 | — | Observed | 1.98 | None |
| D | Observed | 250 | 60 | — | — | 2.17 | None |
| E | Observed | 16 | 60 | 20 | Observed | 2.95 | None |
| F | Observed | 16 | 60 | 120 | Observed | 2.97 | None |
| G | — | — | — | — | Observed | 3.06 | None |
| H | — | 250 | 60 | — | Observed | 3.07 | None |
| I | — | — | — | — | — | 3.85 | Observed |
| J | — | 250 | 60 | — | — | 4.39 | Observed |
| K | — | 250 | 1200 | — | — | 5.20 | Observed |
| L | — | 16 | 5 | 120 | — | 5.19 | Observed |
| M | Observed | 16 | 60 | 120 | — | 5.67 | Observed |
| N | — | 16 | 60 | 120 | — | 6.75 | Observed |

The reason why TiO is less likely to float with a decrease in thickness of the modified layer 3*a* is presumed as follows. On the protective layer 3, the sidewall protective layer 5, the discharge port forming member 6, and the adhesion layer 14 of the laminate members are formed. At this step, an exposed part 20 at which a part of the protective layer is exposed is also formed (FIG. 2B). With this configuration, during use of the liquid discharge head, the exposed part 20 is exposed to a liquid such as an ink.

As a vertical arrow of FIG. 2C, first, the dissolution of the modified layer 3*a* proceeds in the direction perpendicular to the plane exposed to an ink, and the cross section of the modified layer 3*a* appears along the edge of the TiO pattern. This cross section is exposed to the ink, so that dissolution also proceeds in the cross sectional direction (horizontal arrow). However, the passage for the ink narrows with a decrease in thickness of the modified layer 3*a*, and the advance of the ink in the cross sectional direction slows down, so that the dissolution rate is reduced. Then, when the thickness becomes smaller than a certain thickness, the dissolution ceases to proceed, so that floating of the TiO film is not caused (FIGS. 2A', 2B', and 2C').

Further, it has been indicated that the thickness of the modified layer 3*a* has a dependency on the ashing conditions, particularly the stage temperature, the treatment time, and the RF bias power at the time of ashing. For the sample B of Table 1, ashing was performed at a stage temperature of 60° C. for 1 minute. In contrast, for the sample D, ashing was performed at a stage temperature of 250° C. for 1 minute. This indicates that the thickness of the modified layer 3*a* formed by ashing increases with an increase in stage temperature.

Herein, for both the sample B and the sample D, an RF bias was not applied during ashing. The sample M was applied with an RF bias power of 120 W at a stage temperature of 16° C., and was subjected to ashing. Despite that the stage temperature was lower than those of the samples B and D, the thickness of the modified layer 3*a* was larger than those of the two. This indicates that the thickness of the modified layer 3*a* increases with an increase in RF bias power.

The foregoing description indicates that the thickness of the modified layer 3*a* has a dependency upon the stage temperature and the RF bias power during ashing. In addition, it can be considered that the RF bias power more largely affects the thickness of the modified layer 3*a* than the stage temperature. From this, it is presumed that the formation mechanism of the modified layer 3*a* varies between ashing without applying an RF bias and ashing with an RF bias applied.

With ashing without an RF bias, an oxygen radical reacts with the surface of the SiCN film. At this step, presumably, oxygen radicals substitute for C and N of the constituent elements, so that the oxygen content gradually increases in the thickness direction, resulting in the formation of the modified layer 3*a*. On the other hand, with ashing with an RF bias applied, in addition to the reaction of oxygen radicals, oxygen ions linearly collide with the film surface. When the acceleration energy onto the substrate given to oxygen ions by the RF bias is larger than the interatomic bond energy of the film surface, the interatomic bond is cut upon collision, so that atoms forming the film are popped out.

Oxygen is deposited on the popped-out portion. As a result, presumably, a modified layer 3*a* more disturbed in composition and also lower in density than the modified layer 3*a* formed by the reaction with only oxygen radicals is formed. Simultaneously, when the acceleration energy onto the substrate of oxygen ions is smaller than the interatomic bond energy of the film surface, the mechanism of modified layer formation becomes equal to that of the case where an RF bias is not applied, and presumably, the modified layer 3*a* can be thinned.

The acceleration energy onto the substrate by oxygen ions is determined by the effective voltage Vdc acting between an oxygen plasma and the sample when an RF bias is applied. Therefore, presumably, the thickness of the modified layer 3*a* can be suppressed by controlling the Vdc, and suppressing the Vdc to a given value or less. In that case, for example, when a SiCN film is subjected to ashing, the bond energies of the Si—C bond and the Si—N bond of the main interatomic bonds of the film are about 100 eV and about 102 eV, respectively. For this reason, it can be considered that the Vdc may only be set at less than 100 V.

From the estimation mechanism and the results of Table 1, it has been presumed that it is effective to set the thickness of the modified layer 3*a* at 3.40 nm or less by optimization of the ashing conditions. The thickness of the modified layer 3*a* is preferably set at 3.20 nm or less, more preferably 3.00 nm or less, yet more preferably 2.00 nm or less, still more preferably 1.50 nm or less, further more preferably 1.0 nm or less, especially preferably 0.50 nm or less, and in particular preferably 0.10 nm or less. The lower limit has no particular restriction, and the thickness is more preferably smaller, and is, for example, preferably 0.01 nm or more, 0.02 nm or more, or 0.03 nm or more.

As examples of the proper ashing conditions, mention may be made of ashing being performed without application of an RF bias, ashing being performed with such an RF bias power as to make the Vdc less than 100 V, and other ashing conditions. The ashing conditions may be appropriately selected from, for example, the following ranges so that the thickness of the modified layer 3*a* may become less than 3.40 nm.

The microwave power is preferably 500 to 2000 W, and more preferably 800 to 1500 W. The oxygen gas flow rate at 25° C. is preferably 100 to 1000 sccm, and more preferably 200 to 600 sccm. The process pressure is preferably 20 to 200 Pa, and more preferably 40 to 100 Pa. The stage temperature is preferably 5 to 400° C., and more preferably 10 to 300° C. The treatment time is preferably 10 to 600 seconds, and more preferably 30 to 400 seconds. When an RF bias is applied, the RF bias power may only be appropriately selected within the range of, for example, preferably 20 W or less so that the Vdc may become less than 100 V.

Even when such ashing as to result in the state of a thickness of the modified layer 3*a* of more than 3.40 nm is carried out, presumably, it is also effective to reduce the thickness of the modified layer 3*a*, and set the thickness at 3.40 nm or less by performing another step. In this case, the modified layer 3*a* may be fully removed. Namely, the thickness of the modified layer 3*a* can be set at from 0.00 nm to 3.40 nm. At this step, it is preferable to adopt a method not causing contamination such as organic contamination on the protective layer 3.

Examples thereof may include a method in which the modified layer 3*a* formed by ashing is etched with a hydrofluoric acid. Namely, after the ashing step, a step of etching the protective layer 3 having the modified layer 3*a* formed thereon, and removing at least a part of the modified layer 3*a* is preferably adopted. Etching using a hydrofluoric acid such as a buffered hydrofluoric acid as an etchant is more preferable. The etching has no particular restriction, and a known method such as a spin etching method can be adopted. The treatment time of etching has no particular restriction, and is preferably 10 to 200 seconds, and more preferably 30 to 100 seconds. The conditions may only be adjusted so that the thickness of the modified layer 3*a* can be controlled within a specific range. Although not particularly restricted, for example, in the case of the spin etching method, for example, etching is performed with a flow rate of the etchant of 2.0 L/min, and a number of revolutions of the wafer of 1000 rpm.

Further, as the means for removing the modified layer 3*a*, reverse sputtering can be adopted. Namely, after the ashing step, a step of subjecting the protective layer 3 including the modified layer 3*a* formed thereon to reverse sputtering, and removing at least a part of the modified layer 3*a* is preferably adopted. Examples thereof may include reverse sputtering using an inert gas such as Ar. The conditions for reverse sputtering may only be adjusted so that the thickness of the modified layer 3*a* can be controlled within a specific range, and has no particular restriction. Examples thereof may include an Ar gas flow rate of 30 sccm, and a process time of 25.9 s.

Further, for example, when the temperature during deposition is as high as 400° C., the protective layer 3 may have the modified layer 3*a* on the surface at the point in time of deposition. In such a case, it is effective to control the thickness of the modified layer 3*a* at 3.40 nm or less by previously removing the modified layer 3*a* with some method, or by other procedures. Namely, the method preferably has a step of removing at least a part of the modified layer 3*a* before the step of forming the laminate member. In the step of removing at least a part of the modified layer 3*a*, the thickness of the modified layer 3*a* is preferably controlled at 3.40 nm or less.

Examples of the removal method in the step of removing at least a part of the modified layer 3*a* may include etching or reverse sputtering. Etching or reverse sputtering are as described above. An ashing step of subjecting the surface of the protective layer to ashing by, if required, controlling the thickness of the modified layer 3*a* to 3.40 nm or less after removal of the modified layer 3*a* may be adopted.

The steps described up to this point provide a liquid discharge head.

Namely, preferably, the method for manufacturing a liquid discharge head includes an ashing step of subjecting the surface of the protective layer to ashing before the step of forming the laminate member, in which the ashing step forms a modified layer.

Further, the method for manufacturing a liquid discharge head is preferably a method for manufacturing a liquid discharge head comprising:

- a substrate,
- a protective layer covering at least a part of the substrate, and
- a laminate member formed on the protective layer, wherein
- the method comprises
  - a step of forming the protective layer on at least a part of the substrate, and
  - an ashing step of subjecting the surface of the protective layer to ashing, and
  - a step of forming the laminate member on the protective layer with a part of the protective layer exposed after the ashing step,
- the protective layer comprises at least Si and C,
- the content of oxygen in a bulk of the protective layer is less than 20 atomic % in terms of element composition ratio,
- the ashing step forms a modified layer with an oxygen content of 20 atomic % or more in terms of element composition ratio on the surface of the protective layer, and
- the thickness of the modified layer between the protective layer and the laminate member is 3.40 nm or less.

Preferably, the liquid discharge head provided by the steps described up to this point has a substrate, a protective layer covering at least a part of the substrate, and a laminate member formed on the protective layer,

- in which the laminate member is provided so as to form an exposed part at which a part of the protective layer is exposed,
- the protective layer comprises at least Si and C,
- the content of oxygen in a bulk of the protective layer is less than 20 atomic % in terms of element composition ratio,
- a modified layer with an oxygen content of 20 atomic % or more in terms of element composition ratio is present on the surface of the protective layer, and
- the thickness of the modified layer between the protective layer and the laminate member is 3.40 nm or less.

In the following examples, as an example applied to a more specific device, the example of a liquid discharge head will be shown.

Example 1

The present Example will show an example of a liquid discharge head in which the thickness of the modified layer 3*a* on the protective layer surface is controlled to 3.40 nm or less by optimizing the ashing conditions.

Figure 3A:
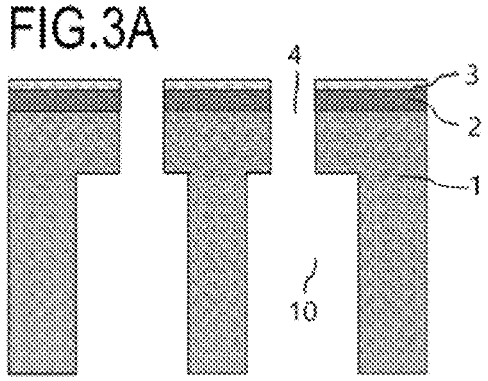
FIGS. 3A to 3D are each a cross sectional view showing a manufacturing step of a liquid discharge head.

First, a silicon substrate 1 with a thickness of 625 μm was prepared (FIG. 3A). For the silicon substrate 1, on one surface (this surface will be hereinafter referred to as a front surface), an element surface 2 including a heat generating element, and a circuit for driving it formed thereon, and a SiCN film ($Si_xC_yN_z$ where x=47, y=11, and z=42) as a protective layer 3 for protecting the element surface 2 are previously formed. On another surface 1*a* opposite to the surface including the element surface 2 formed thereon of the substrate 1, a part of the liquid passage 10 with a depth of about 500 μm is formed. Further, a liquid feeding port 4 communicating with the liquid passage 10 from the surface of the substrate 1 is formed. Incidentally, on the surface of the protective layer 3 of the laminated body, the modified layer 3*a* was not formed.

Then, as cleaning before the deposition of the sidewall protective layer 5, ashing was carried out from the front surface of the substrate 1 using an ashing device (MAS-8220AT). As the ashing conditions at this step, two conditions of a condition without applying an RF bias, and a condition resulting in a Vdc of less than 100 V were selected based on the results of Table 1, and the foregoing estimation mechanism. Below, the details of the two conditions will be shown.

Under one condition, an oxygen plasma was generated with a microwave power of 1200 W, an oxygen gas flow rate of 500 sccm (25° C.), and a process pressure of 80 Pa, and an RF bias was not applied, thus, the treatment was performed at a stage temperature of 250° C. for 60 seconds (which will be hereinafter referred to as Condition 1). The thickness of the modified layer 3*a* at this step was 2.17 nm.

Under another condition, with a microwave power of 1000 W, an oxygen gas flow rate of 400 sccm (25° C.), and a process pressure of 60 Pa, an oxygen plasma was generated, and an RF bias power of 20 W was applied, thus, the treatment was performed at a stage temperature of 16° C. for 60 seconds (which will be hereinafter referred to as Condition 2). The Vdc when an RF bias of 20 W was applied was 81.6V. The thickness of the modified layer 3*a* at this step was 2.95 nm.

Further, as a comparison, ashing was also carried out under the condition resulting in a Vdc of 100 V or more. Below, the details of the condition will be shown. With a microwave power of 1000 W, an oxygen gas flow rate of 400 sccm (25° C.), and a process pressure of 60 Pa, an oxygen plasma was generated, and an RF bias power of 120 W was applied, thus, the treatment was performed at a stage temperature of 16° C. for 60 seconds (which will be hereinafter referred to as Condition 3). The Vdc when an RF bias of 120 W was applied was 320 V. The thickness of the modified layer 3*a* at this step was 5.67 nm.

Figure 3B:
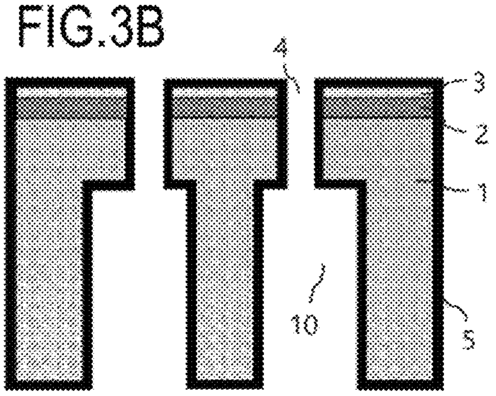
Figure 3C:
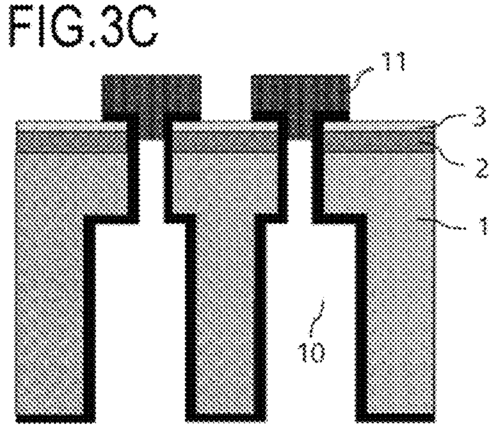

Then, on the protective layer 3, a TiO film was deposited with a thickness of 80 nm as the sidewall protective layer 5 with the atomic layer deposition method (ALD method: Atomic Layer Deposition method) (FIG. 3B). then, on the front surface of the substrate 1, a filmed photoresist was laminated, and using a photomask and an exposure device, a pattern 11 of a photoresist was formed only at the liquid feeding port peripheral part (FIG. 3C). Then, with the pattern 11 as a mask, the sidewall protective layer 5 at unnecessary portions of the front surface of the substrate 1 was etched. As an etchant, a buffered hydrofluoric acid was used. The pattern 11 of the photoresist used for the mask was subsequently removed.

Figure 3D:
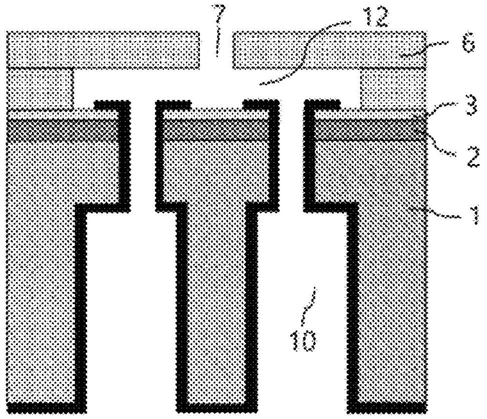

Then, lamination, exposure, and development of the filmed photosensitive epoxy resin were repeated twice. As a result of this, a discharge port forming member 6 was formed on the protective layer on the front surface side of the substrate 1, and a liquid discharge port 7, and a liquid passage 12 from the liquid feeding port 4 to the liquid discharge port 7 were formed, resulting in the completion of a liquid discharge head (FIG. 3D). The portion at which the discharge port forming member 6 and the sidewall protective layer 5 are not present on the protective layer 3 serves as an exposed part 20.

Finally, the liquid discharge head was divided into individual pieces, and the individual pieces were immersed in an ink heated to 121° C. for three weeks. Thereafter, the adhesion interface between the protective layer 3 and the discharge port forming member 6 was observed by a microscope. At this step, for both the substrates subjected to ashing under Conditions 1 and 2, floating due to dissolution of the modified layer 3*a* was not observed. In contrast, for the substrate subjected to ashing under Condition 3, floating due to dissolution of the modified layer 3*a* was observed.

Example 2

The present Example will show an example of a liquid discharge head in which the modified layer 3*a* on the surface of the protective layer 3 formed by ashing is removed by the subsequent step, thereby controlling the thickness of the modified layer 3*a* to 3.40 nm or less. First, a laminated body including the same liquid feeding port 4 and liquid passage 10 as those of Example 1 formed therein was prepared. As cleaning before the deposition of the sidewall protective layer 5, ashing was carried out from the front surface of the substrate 1. Ashing at this step was performed in the following manner. With a microwave power of 1000 W, an oxygen gas flow rate of 400 sccm (25° C.), and a process pressure of 60 Pa, an oxygen plasma was generated, and an RF bias power of 120 W was applied. Thus, the treatment was performed at a stage temperature of 16° C. for 60 seconds. The Vdc when an RF bias of 120 W was applied was 320 V. The thickness of the modified layer 3*a* at this step was 5.67 nm.

Subsequently, using a spin etching method in which an etchant is added dropwise while rotating the substrate 1, etching by a buffered hydrofluoric acid was performed for 60 seconds. The thickness of the modified layer 3*a* at this step was 2.97 nm.

Then, in the same manner as in Example 1, a sidewall protective layer 5 was deposited, and patterning was performed. All the subsequent steps followed those of Example 1. Finally, the liquid discharge head was divided into individual pieces, and the individual pieces were immersed in an ink heated to 121° C. for three weeks. Thereafter, the adhesion interface between the protective layer 3 and the discharge port forming member 6 was observed by a microscope. At this step, floating due to dissolution of the modified layer 3*a* was not observed.

Example 3

The present Example will show an example of a liquid discharge head in which the modified layer 3*a* formed on the surface of the protective layer 3 at the time point of deposition is previously removed, thereby controlling the thickness of the modified layer 3*a* to 3.40 nm or less. First, a laminated body including the liquid feeding port 4 and the liquid passage 10 formed therein was prepared as with Example 1. At this step, the protective layer 3 had the modified layer 3*a* on the surface at the time point of deposition. The thickness of the modified layer 3*a* at this step was 3.85 nm. The modified layer 3*a* was previously removed with reverse sputtering by Ar (conditions: an Ar gas flow rate of 30 sccm, and a process time of 25.9 s). The film thickness of the modified layer 3*a* at this step was 1.21 nm.

Then, as cleaning before the deposition of the sidewall protective layer 5, ashing was carried out from the front surface of the substrate 1. Ashing at this step was performed in the following manner. With a microwave power of 1200 W, an oxygen gas flow rate of 500 sccm (25° C.), and a process pressure of 80 Pa, an oxygen plasma was generated, and an RF bias was not applied. Thus, the treatment was performed at a stage temperature of 250° C. for 60 seconds. The thickness of the modified layer 3*a* at this step was 2.17 nm.

Subsequently, in the same manner as in Example 1, the sidewall protective layer 5 was deposited, and patterning was performed. All the subsequent steps followed those of Example 1. Finally, the liquid discharge head was divided into individual pieces, and the individual pieces were immersed in an ink heated to 121° C. for three weeks. Thereafter, the adhesion interface between the protective layer 3 and the discharge port forming member 6 was observed by a microscope. At this step, floating due to dissolution of the modified layer 3*a* was not observed.

Example 4

Figure 4A:
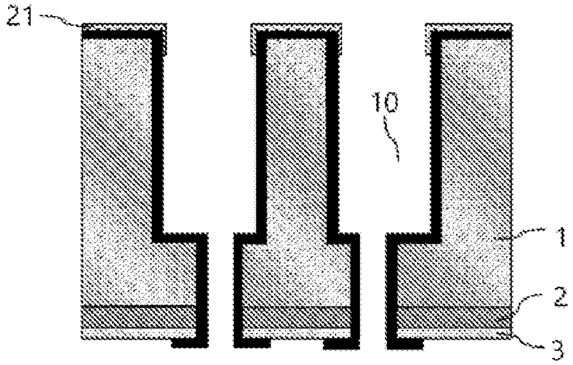
FIGS. 4A to 4C are each a cross sectional view showing a manufacturing step of a liquid discharge head.

The present Example will show an example in which attention is focused on the adhesiveness between the back surface protective layer 21 and the adhesion material 22 when the adhesion material 22 is formed on the back surface protective layer 21. An example of the liquid discharge head in which the thickness of the modified layer 21*a* on the back surface protective layer 21 formed by ashing was controlled to 3.40 nm or less will be shown. In the same manner as in Example 1, a laminated body including a liquid feeding port 4 and a liquid passage 10 formed therein was prepared. Then, in the same manner as in Example 1, the sidewall protective layer 5 was deposited. Subsequently, on the surface 1*a* opposite to the element surface 2, a SiC film was deposited with a thickness of 50 nm as the back surface protective layer 21 by a CVD method, and patterning was performed (FIG. 4A).

Then, as cleaning before deposition of the adhesion material 22, the back surface protective layer 21 was subjected to ashing. The ashing was carried out under Condition 1. The thickness of the modified layer 21*a* at this step was 4.44 nm.

Subsequently, on the surface 1*a* side, by using a spin etching method in which an etchant is added dropwise while rotating the substrate 1, etching by a buffered hydrofluoric acid was performed for 60 seconds. The thickness of the modified layer 21*a* at this step was 1.21 nm.

Figure 4B:
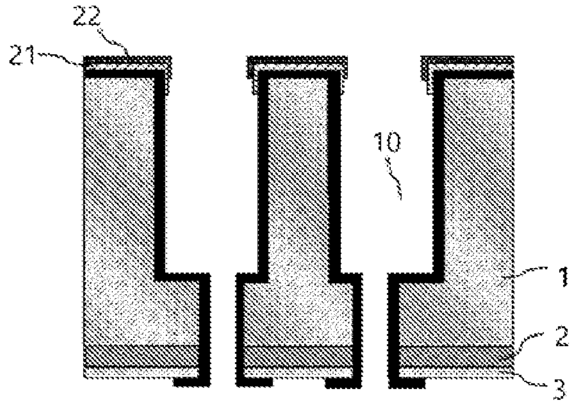
Figure 4C:
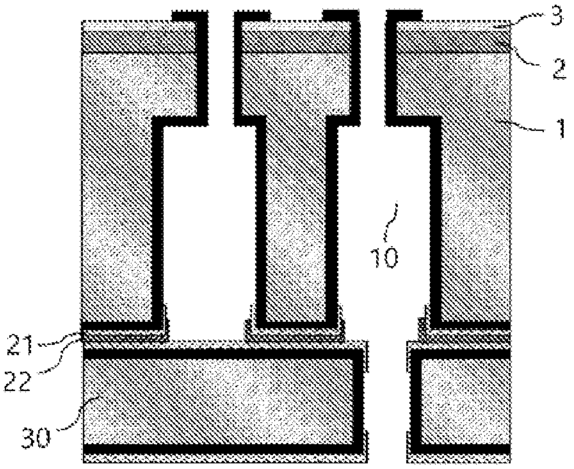

Then, a filmed adhesion material 22 was laminated on the back surface protective layer 21 (FIG. 4B), and a junction substrate 30 to be joined to the substrate 1 was joined thereto (FIG. 4C). After joining, baking was carried out at 250° C. for 1 hour, thereby hardening the adhesion material 22. The portion at which the adhesion material 22 on the back surface protective layer 21 was not present served as the back surface protective layer exposure part 23.

Finally, the liquid discharge head was divided into individual pieces, and the individual pieces were immersed in an ink heated to 121° C. for three weeks. Thereafter, the adhesion interface between the back surface protective layer 21 and the adhesion material 22 was observed by a microscope. At this step, floating due to dissolution of the modified layer 21*a* was not observed.

Example 5

The present Example will show an example in which attention is focused on the adhesiveness between the protective layer and a bump when the bump is formed at the electrode pad part of the liquid discharge head. The example will be shown in which in the same manner as in Example 1, optimization of the ashing conditions controls the thickness of the modified layer 3*a* on the protective layer surface to 3.40 nm or less.

Figure 6A:
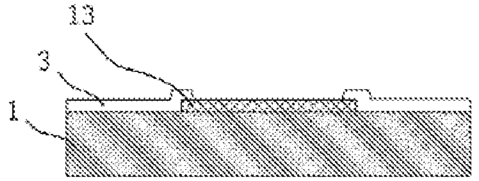
FIGS. 6A to 6D are each a cross sectional view showing a bump manufacturing step at an electrode pad part of a liquid discharge head.

First, a silicon substrate 1 with a thickness of 625 μm was prepared (FIG. 6A). On the silicon substrate 1, on one surface thereof, an element (not shown) including a heat generating element, and a circuit for driving it formed therein, and a SiCN film ($Si_xC_yN_z$ where x=47, y=11, and z=42) as a protective layer 3 for protecting the element are previously formed. Further, a part of the protective layer 3 is opened, and an electrode pad 13 to be electrically connected with the heat generating element is exposed. The electrode pad 13 includes a noble metal such as iridium. Incidentally, on the surface of the protective layer 3 of the laminated body, the modified layer 3*a* was not formed.

Then, as cleaning before formation of the bumps on a part of the protective layer 3 and on the electrode pad 13, ashing was carried out from the front surface of the substrate 1 using an ashing device (MAS-8220AT). As the ashing conditions at this step, two conditions of a condition without applying an RF bias, and a condition resulting in a Vdc of less than 100 V were selected based on the results of Table 1, and the foregoing estimation mechanism. Below, the details of the two conditions will be shown.

Under one condition, an oxygen plasma was generated with a microwave power of 1200 W, an oxygen gas flow rate of 500 sccm (25° C.), and a process pressure of 80 Pa, and an RF bias was not applied, thus, the treatment was performed at a stage temperature of 250° C. for 60 seconds (which will be hereinafter referred to as Condition 1). The thickness of the modified layer 3*a* at this step was 2.17 nm.

Under another condition, with a microwave power of 1000 W, an oxygen gas flow rate of 400 sccm (25° C.), and a process pressure of 60 Pa, an oxygen plasma was generated, and an RF bias power of 20 W was applied. Thus, the treatment was performed at a stage temperature of 16° C. for 60 seconds (which will be hereinafter referred to as Condition 2). The Vdc when an RF bias of 20 W was applied was 81.6V. The thickness of the modified layer 3*a* at this step was 2.95 nm.

Further, as a comparison, ashing was also carried out under the condition resulting in a Vdc of 100 V or more. Below, the details of the condition will be shown. With a microwave power of 1000 W, an oxygen gas flow rate of 400 sccm (25° C.), and a process pressure of 60 Pa, an oxygen plasma was generated, and an RF bias power of 120 W was applied, thus, the treatment was performed at a stage temperature of 16° C. for 60 seconds (which will be hereinafter referred to as Condition 3). The Vdc when an RF bias of 120

W was applied was 320 V. The thickness of the modified layer 3*a* at this step was 5.67 nm.

Figure 6B:
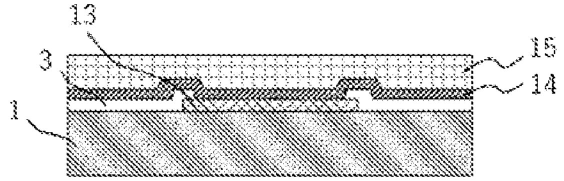
Figure 6C:
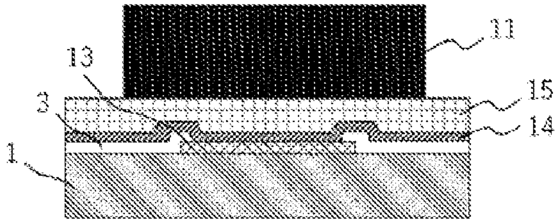
Figure 6D:
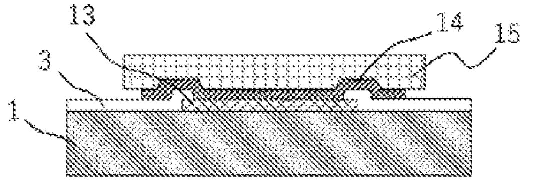

Then, a bump was formed on a part of the protective layer 3 and the electrode pad 13. First, an adhesion layer 14 and an electrode layer 15 were continuously deposited by a vacuum deposition device. Herein, the adhesion layer 14 was deposited with a film thickness of 200 nm using titanium tungsten. Further, the electrode layer 15 was deposited with a film thickness of 400 nm using gold (FIG. 6B). Then, on the front surface of the substrate 1, a photoresist was applied, and using a photomask and an exposure device, a pattern 11 of the photoresist was formed only at the peripheral part of the electrode pad (FIG. 6C). Then, using the pattern 11 as a mask, the electrode layer 15 and the adhesion layer 14 were etched, thereby forming a bump into a desirable shape (FIG. 6D). For etching of the electrode layer 15, an etchant including iodine and potassium iodine as main components was used. Further, for etching of the adhesion layer 14, an etchant including oxygenated water as a main component was used. Further, the pattern 11 of the photoresist used for the mask was subsequently removed.

Finally, the liquid discharge head was divided into individual pieces. The individual pieces were immersed in an ink heated to 121° C. for three weeks. Then, cross section SEM observation was performed, thereby confirming the interface between the protective layer 3 and the adhesion layer 14. At this step, for both the substrates subjected to ashing under Conditions 1 and 2, floating due to dissolution of the modified layer 3*a* was not observed. In contrast, for the substrate subjected to ashing under Condition 3, floating due to dissolution of the modified layer 3*a* was observed.

Example 6

The present Example will show an example of the liquid discharge head in which the thickness of the modified layer 3*a* is controlled to 3.40 nm or less by removing the modified layer 3*a* on the surface of the protective layer 3 formed by ashing by the subsequent step in contrast to Example 4. First, in the same manner as in Example 4, a substrate at which a part of the protective layer 3 was opened, and the electrode pad 13 was exposed was prepared. As cleaning before deposition of the adhesion layer 14 and the electrode layer 15, ashing was carried out from the front surface of the substrate 1. With ashing at this step, with a microwave power of 1000 W, an oxygen gas flow rate of 400 sccm (25° C.), and a process pressure of 60 Pa, an oxygen plasma was generated, and an RF bias power of 120 W was applied. Thus, the treatment was performed at a stage temperature of 16° C. for 60 seconds. The Vdc when an RF bias of 120 W was applied was 320 V. The thickness of the modified layer 3*a* at this step was 5.67 nm.

Subsequently, using a spin etching method in which an etchant is added dropwise while rotating the substrate 1, etching by a buffered hydrofluoric acid was performed for 60 seconds. The thickness of the modified layer 3*a* at this step was 2.97 nm.

Then, in the same manner as in Example 5, the adhesion layer 14 and the electrode layer 15 were deposited, and bump formation was performed. All the subsequent steps followed those of Example 5. Finally, the liquid discharge head was divided into individual pieces, and the individual pieces were immersed in an ink heated to 121° C. for three week. Then, cross section SEM observation was performed, thereby confirming the interface between the protective layer 3 and the adhesion layer 14. At this step, floating due to dissolution of the modified layer 3*a* was not observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-091675, filed May 31, 2021, and Japanese Patent Application No. 2022-045262, filed Mar. 22, 2022, which are hereby incorporated by reference herein in their entirety.

What is claimed is:

1. A method for manufacturing a liquid discharge head comprising:
- a substrate;
- a protective layer covering at least a part of the substrate; and
- a laminate member formed on the protective layer, the method comprising:
- a step of forming the protective layer on the at least the part of the substrate; and
- a step of forming the laminate member on the protective layer with a part of the protective layer exposed,
- wherein the protective layer comprises at least Si and C,
- wherein a content of oxygen in a bulk of the protective layer is less than 20 atomic % in terms of an element composition ratio,
- wherein a modified layer with a content of oxygen of 20 atomic % or more in terms of an element composition ratio is present on a surface of the protective layer, and
- wherein a thickness of the modified layer between the protective layer and the laminate member is 3.40 nm or less.

2. The method for manufacturing the liquid discharge head according to claim 1, further comprising, before the step of forming the laminate member, an ashing step of subjecting the surface of the protective layer to ashing, and the modified layer is formed by the ashing step.

3. The method for manufacturing the liquid discharge head according to claim 2, wherein
in the ashing step, with an ashing method
without applying an RF bias or
with a Vdc of less than 100 V,
the surface of the protective layer is subjected to ashing.

4. The method for manufacturing the liquid discharge head according to claim 1, further comprising, before the step of forming the laminate member, a step of removing at least a part of the modified layer.

5. The method for manufacturing the liquid discharge head according to claim 1, wherein
the protective layer includes at least one selected from a group consisting of a SiC film, a SiCN film, a SiOC film, and a SiOCN film.

6. The method for manufacturing the liquid discharge head according to claim 1, wherein the protective layer is a SiCN film, and the SiCN film is expressed as $Si_xC_yN_z$, where $x+y+z=100$, $30 \leq x \leq 60$, $y \geq 5$, and $z \geq 15$.

7. The method for manufacturing the liquid discharge head according to claim 1, wherein
the laminate member comprises an organic resin.

8. The method for manufacturing the liquid discharge head according to claim 1, wherein
the laminate member comprises a metal oxide.

9. The method for manufacturing the liquid discharge head according to claim 1, wherein
the laminate member comprises an Au film and a TiW film.

10. The method for manufacturing the liquid discharge head according to claim 1, further comprising, before the step of forming the laminate member, a step of removing at least a part of the modified layer by etching on the protective layer.

11. The method for manufacturing the liquid discharge head according to claim 1, further comprising, before the step of forming the laminate member, a step of removing at least a part of the modified layer by reverse sputtering on the protective layer.

* * * * *